J. A. HUNT.
FOLDING PLANT AND SHRUBBERY SUPPORT.
APPLICATION FILED FEB. 20, 1920.

1,361,464. Patented Dec. 7, 1920.

Inventor
James A. Hunt,
J. Walter Fowler, Jr.
Attorney

Witness:
R. F. Beck

UNITED STATES PATENT OFFICE.

JAMES A. HUNT, OF MAMMOTH, WEST VIRGINIA.

FOLDING PLANT AND SHRUBBERY SUPPORT.

1,361,464.  Specification of Letters Patent.  Patented Dec. 7, 1920.

Application filed February 20, 1920. Serial No. 360,119.

*To all whom it may concern:*

Be it known that I, JAMES A. HUNT, a citizen of the United States, residing at Mammoth, in the county of Kanawha and State of West Virginia, have invented certain new and useful Improvements in Folding Plant and Shrubbery Supports, of which the following is a specification.

My invention relates to an improvement in plant and shrubbery frames or supports which are used in connection with tomato and like plants for the purpose of supporting the weight of the fruit bearing stalks.

The object of my invention is to provide a device of this character which is adapted to be folded or collapsed into a compact structure when not in use to facilitate storage of the same; which may be quickly and readily set up and taken down; and which when in use will form a substantial support for the fruit laden branches or stalks of the plant or shrub with which it is used.

In the drawings forming a part of this specification and in which like reference characters indicate like parts in the several views.

Figure 1:
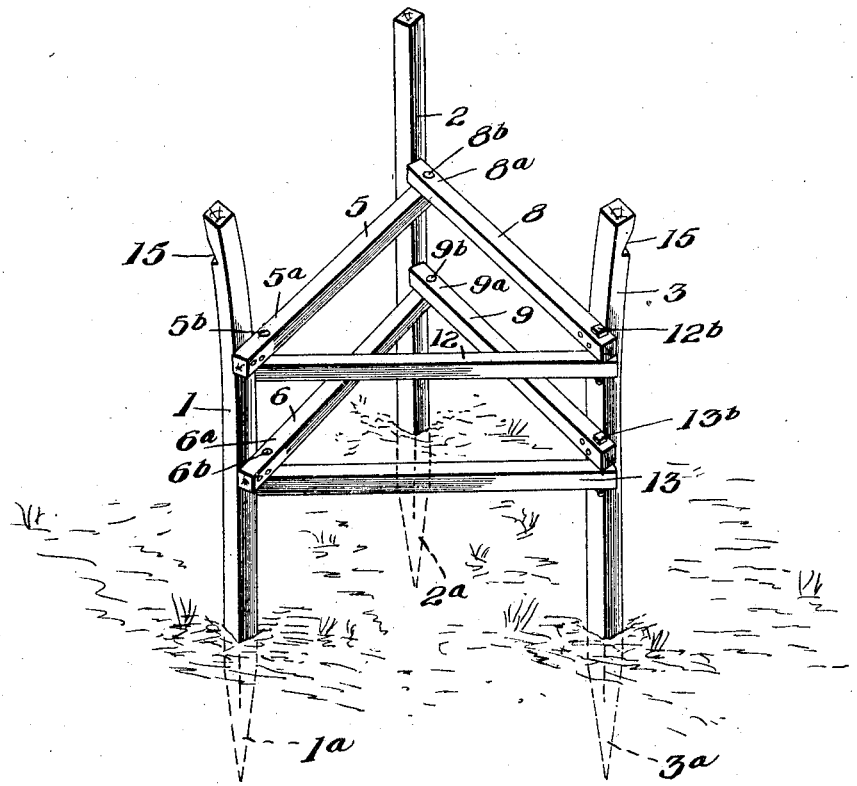
Figure 1 is a perspective view showing my improved support in use.
Figure 2:
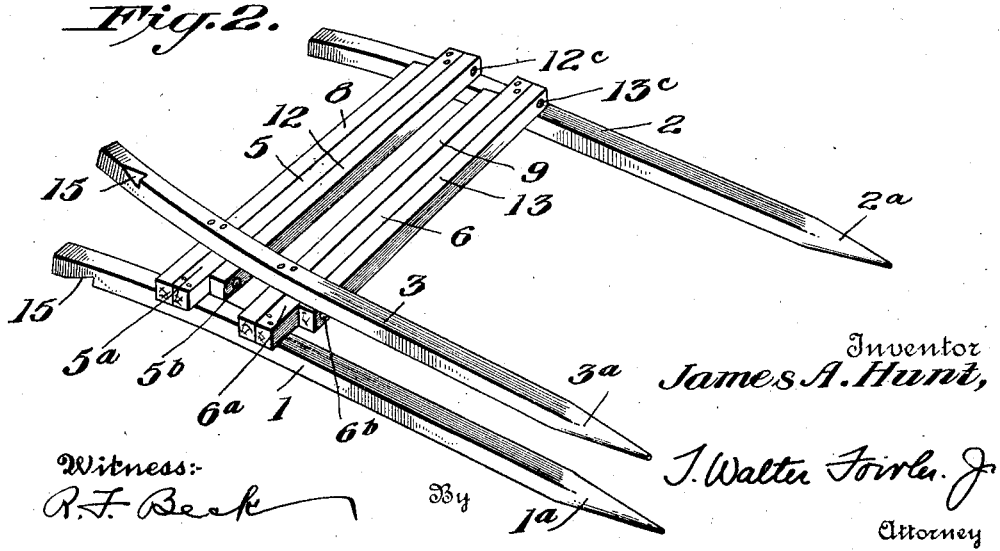
Fig. 2 is a perspective view of the same in its collapsed or folded condition.

Referring to the drawings, my improved support is composed of the stakes 1, 2, and 3, formed preferably of a hard wood not susceptible to ready disintegration through contact with the ground, having pointed ends $1^a$, $2^a$, $3^a$ adapted to be forced into the ground. When the device is in its normal position as in Fig. 1, the stakes are spaced an equal distance apart, and with the connecting bars hereinafter mentioned, the device assumes, in plan, substantially the appearance of a triangle and incloses a space which is partially or entirely occupied by the plant or shrub, the branches of which my device is designed to support.

Two of the stakes, namely 1 and 2, have attached to them by any convenient fastening means the ends of the parallel bars 5 and 6; to the other stake 3 is attached one end of a pair of parallel bars 8 and 9, the opposite ends of which are in turn pivotally attached at points $8^a$ and $9^a$ by means of bolts $8^b$ and $9^b$ to the bars 5 and 6 which connect the stakes 1 and 2. A third set of parallel bars 12 and 13 have one end thereof pivotally connected at points $5^a$ and $6^a$ by means of bolts $5^b$ and $6^b$ to the bars 5 and 6, while the opposite ends of these bars 12 and 13 are in turn removably connected by means of pins $12^b$ and $13^b$ to the outer ends of the bars 8 and 9 which extend substantially between the stakes 2 and 3. The connection between the bars 12 and 13 and the bars 8 and 9 is, preferably, of a readily detachable character so that the connection may be quickly broken and the frame or support folded or collapsed when desired, as for instance when storing the frame or support during the season when it is not in use, or in transportation.

The stakes 1, 2, and 3 flare outwardly at one end to increase the top area of the space inclosed by the stakes when the support is in use. The upper portions of each of these stakes, preferably the outer corners, are notched as at 15, for the purpose of receiving a wire or string which will be found useful when the device is used for supporting an unusually large plant or shrub.

When the device is to be used it will be opened and placed about the plant or shrub, the free ends of bars 12 and 13 being placed under and immediately adjacent to the overlapping ends of bars 8 and 9, and openings $12^c$—$13^c$ are brought into register with corresponding openings $8^c$—$9^c$ in the bars 8 and 9. Pins or other like fastenings $12^b$—$13^b$ are then inserted in the alined openings, thereby securing the bars 12 and 13 to the bars 8 and 9 and holding the frame rigidly together in position. The stakes 1, 2, and 3 are then driven into the ground a short distance, sufficient to support the device firmly in an upright position. As the plant grows it substantially fills the space in the center of the frame and its fruit bearing branches will rest upon and find a firm support on the several bars which constitute the sides of the frame, thereby preventing the weight of the fruit from breaking the branches and also preventing the fruit from contact with the ground.

When the support or frame is to be stored for the winter, or for transportation, the pins $12^b$—$13^b$ will be removed, the ends of the stakes will be drawn out of the ground, and the bars 12 and 13 being disconnected from the bars 8 and 9 will be folded over on their pivots $5^a$ and $6^a$ into position adjacent stakes 1 and 2 and below bars 5 and 6. Bars 8 and 9 and stake 3 will then be turned on pivots $8^a$ and $9^a$ into position adjacent the stakes 1 and 2, bars 8 and 9 lying above bars 5 and 6 respectively and stake 3 resting against bars 5, 6, 12, and 13 adjacent stake 1.

In its folded position my support comprises a relatively flat, compact device which will occupy little space, which may be readily handled when moved about, and which is not likely to become damaged.

What I claim as new and desire to secure by Letters Patent is:—

1. A foldable plant support adapted to be opened into a substantially triangular form and composed of corner posts, parallel bars extending between each of said posts, certain of said bars being directly pivotally connected so that they may fold one relatively to the other, and certain other of said bars having direct detachable connections whereby the support may be collapsed or folded.

2. A foldable plant support adapted to be extended into a substantially triangular form, said support comprising corner stakes, parallel bars extending between each of said stakes, and removable connections between certain of said bars.

3. A foldable plant support adapted to be extended into a substantially triangular form, said support being composed of corner stakes and connecting parallel bars, said stakes flaring outwardly at one end to increase the top area of the space inclosed by the stakes when the support is in use.

4. A three panel plant support each panel of which comprises a corner stake and parallel bars, the ends of certain of said bars overlying and being directly pivotally connected to one side of other of the bars and to one of the stakes, and the ends of certain other of said bars underlying and being directly pivotally connected to the second named bars, and removable fastenings between the end portions of the first and third named series of bars.

5. A plant support comprising corner stakes and a series of parallel bars, one series of said bars being connected at both ends to two of said stakes; another series of said bars being connected near one end to another of said stakes and having their opposite ends pivotally connected near one end of the first named series of bars, and a third series of bars having one end pivotally connected to the bars of the first series and having their opposite ends detachably connected to the bars of the second named series.

In testimony whereof I affix my signature.

JAMES A. HUNT.